(12) United States Patent
Lam

(10) Patent No.: US 7,177,707 B2
(45) Date of Patent: Feb. 13, 2007

(54) VARIABLE SPECIFICATION FUNCTIONAL BLOCKS INTEGRATED CIRCUIT SYSTEM SUITABLE FOR DETECTING RESISTOR IDENTIFICATIONS

(76) Inventor: Peter Ar-Fu Lam, 20104 Wayne Ave., Torrance, CA (US) 90503

( * ) Notice: Subject to any disclaimer, the term of this patent is extended or adjusted under 35 U.S.C. 154(b) by 489 days.

(21) Appl. No.: 10/227,708

(22) Filed: Aug. 26, 2002

(65) Prior Publication Data

US 2002/0198718 A1    Dec. 26, 2002

Related U.S. Application Data

(63) Continuation-in-part of application No. 09/896,434, filed on Jun. 29, 2001, now Pat. No. 6,586,942.

(60) Provisional application No. 60/316,643, filed on Aug. 31, 2001.

(51) Int. Cl.
*G05B 11/01* (2006.01)
*A63F 3/00* (2006.01)

(52) U.S. Cl. .................. 700/17; 273/237; 434/316

(58) Field of Classification Search ............... 700/17, 700/18, 19, 3; 273/237, 238; 434/316, 335
See application file for complete search history.

(56) References Cited

U.S. PATENT DOCUMENTS

| | | | | | |
|---|---|---|---|---|---|
| 3,481,604 | A | * | 12/1969 | Fan | 273/238 |
| 5,190,285 | A | * | 3/1993 | Levy et al. | 463/36 |
| 5,277,588 | A | * | 1/1994 | Lin | 434/335 |
| 5,851,119 | A | * | 12/1998 | Sharpe et al. | 434/317 |
| 6,094,045 | A | * | 7/2000 | Zoellick | 324/158.1 |
| 6,190,174 | B1 | * | 2/2001 | Lam | 434/169 |
| 6,235,555 | B1 | * | 5/2001 | Cho | 438/112 |
| 6,356,255 | B1 | * | 3/2002 | Weil et al. | 345/156 |
| 6,443,796 | B1 | * | 9/2002 | Shackelford | 446/91 |

\* cited by examiner

*Primary Examiner*—Thomas Pham (57) ABSTRACT

The invention discloses a specially designed resistor identity IC provided for products that require article identification on contact. The invention is further developed to provide a family of Variable Specification Functional Block ICs that can be selected to form a COB assembly. An Integrated Programming technology is developed to program all the different controllers on the COB with one single program. A Reduced Signal Communication Interface technology is also introduced to minimize EMI interference of the COB assembly.

25 Claims, 8 Drawing Sheets

VARIABLE SPECIFICATION FUNCTIONAL BLOCKS INTEGRATED CIRCUIT SYSTEM SUITABLE FOR DETECTING RESISTOR IDENTIFICATIONS

RELATED APPLICATIONS

This application claims priority to provisional application No. 60/316,643, filed Aug. 31, 2001. This application is also a continuation in part (CIP) application of nonprovisional application Ser. No. 09/896,434, filed Jun. 29, 2001, now U.S. Pat. No. 6,586,942.

FIELD OF THE INVENTION

The present invention relates to a variable specifications, multiple functional blocks integrated circuit system suitable for chip on board applications. In an embodiment, a function block integrated circuit directs the function of the system in response to the specific value of an external resistor detected.

BACKGROUND OF THE INVENTION

Traditional integrated circuit (IC) comprises of a microcontroller, input/output ports and additional functional specific circuits designed to perform special functions. Other application specific functional circuits such as resistor identification circuits are provided outside the integrated circuit making use of discrete digital, analog components, or additional special function IC such as operational amplifiers and comparators. Since application circuit requirements vary, manufacturers are required to provide a family of microcontrollers IC each having a different functional, performance, or interfacing specifications to meet the different application needs of the users. Applicant's prior art disclosure, a toy designed by the applicant for Mattel Toys named ARCO—Once Upon A Time Playset during April 1994, discloses a simple low cost resistor sensing circuit which trigger a voice generating microcontroller chip to produce different voice response in according to the contact of four different resistor values.

SUMMARY OF THE INVENTION

The present invention is first directed to the design of a single chip integrated circuit (IC) capable of providing an audio or visual response towards the contact of a commercial passive component, such as a resistor or a capacitor. This design of the IC is configured to provide a selected combination of the following preferred characteristics:

1. Each audio or visual responses is predefined by one specific value of the identity passive component detected;

2. The sensing circuit of the IC is configured to differentiate the tolerance of the existing commercial components; for example, +/−5% tolerance for resistors or +/−10% tolerance for capacitors;

3. The sensing circuit should be able to detect a wide range of identity components, precisely responding to at least 20 to 100 different values of the identity components;

4. Preferably only two input pins are required for the IC to detect the identity component;

5. The integrated circuit, including the precision detection circuit, should work with a voltage range representing the working conditions of two to three batteries. Acknowledging the variation of batteries under different loading conditions, the working voltage range is desirable for working in the voltage range of 2.2 volt to 5 volt;

6. The integrated circuit should not require external operational amplifier or comparator IC;

7. The standby current of the IC should be of a low value enabling the circuit to be always powered on for awaiting the contact of the identity passive component, a target standby current is below 10 uA; and 8. The circuit should be automatically switched from the microampere low current mode into the higher current working mode when an identity component touches the designated detection input pins.

9. The IC is preferred to be fabricated with CMOS technology.

In a first application example of this IC, a doll having a voice generating chip is provided with two conductive contacts located at the lips of the doll. Food articles of different colors or shapes are provided with the play set. Each food article is provided internally a specific valued resistor connected to two conductive contacts exposed on the surface of the food article. When the doll is fed with a selected food article, the conductive contacts of the doll are connected with the internal resistor of the food article. The detection circuit inside the IC directs the voice generation circuit to produce a different food specific voice message in accordance to the identity of resistance value detected. As illustrated in this application example, it is critical for the detection circuit to differentiate a wide range of resistor values, each separated in a tight +/−5% tolerance values, in order to identify a high number of identity articles. Enlisted below are the standard commercial resistor values:

Ohm range (discarding resistance value below 100 ohm): 100, 110, 120, 130, 150, 180, 200, 220, 240, 270, 300, 330, 360, 390, 430, 470, 510, 560, 620, 680, 750, 820, 910; total 24 different values. The k-ohm range is obtained by multiplying the above resistance values by 10 to provide another 24 different resistor values. The 10 k-ohm range is obtained by multiplying the above range of resistor values by 100 to provide 24 additional resistor values. The 100 k-ohm range resistor values is again obtained by multiplying the above resistor values by 1000 to provide further 24 resistor values. The total number of commercially available resistor values in between 100 ohm to 1M ohm is [(24×4)+1]=97. It means the high precision circuit provided by the subject invention is able to identify 97 different identity articles making use of a single commercial standard resistor in each article. If two resistors are provided in each article for identification detection, the total number of combination is 97×97=9,409 which is more than enough for regular toy applications. It should be noted that among the 97 resistor values identified, some of the resistor values are less popular and can be considered as a secondary standard resistor value. Examples of these values are 130 ohm, and 240 ohm.

The +/−5% resolution of the resistors is imposing a very difficult challenge to the single chip IC circuit design, especially for it to work under a very lax supply voltage range desirably between 2.2V to 5V. Another challenge of the invention step is to provide a very low standby current, preferably to be lower than 10 uA; while still be able to initiate the detection circuit when a resistor is connected to the detection circuit input terminal. This requirement rules out the use of commercial analog comparators or operational amplifiers, as the standby current of these components is well above the desirable limit suitable for battery operation. Another difficulty of the input circuit design is for it to sense a broad range of resistance value, from 100 ohm to 1M ohm, and initiate the IC from the low current standby mode to start performing the resistance detection process. In order to minimize the cost of the IC chip, the number of pins required by the resistor connection terminal is preferably to be limited to two pins as compare with three to four pins for lower resolution dual resistors detection circuit.

In accordance to the research of the invention, the preferred technology for fabricating the IC is CMOS. In a first embodiment, a group of N or P channel MOS gates, each can be switched on and off, provides a different reference resistance to the detection circuit for checking the external resistor value. The reference resistance is arranged to form a potential divider with the external resistor to trigger a voltage comparison circuit or an internal threshold switching circuit. In an alternate embodiment, the switched reference resistance can be used to control the current flowing through the external resistor for creating a reference voltage drop across the external resistor. Theoretically this voltage is proportional to the value of the external resistance and therefore it can be used to indirectly identify the external resistor. The detecting process requires a micro-controller programmed to properly switch the group of NMOS or PMOS gates, according to a predefined detection algorithm. Each of these gates represents a resistance value.

Due to the tight resistor tolerance and the lax voltage supply requirements, an external reference component, preferably another low cost resistor is added to calibrate the circuit during the resistance identifying process. The reference component helps to compensate errors due to fabrication process of the IC, variation of the battery voltage and variation of logic transition threshold level inside the IC. It should be noted that the resistance ratio of a potential divider circuit is relatively independent of power supply voltage variation.

Once an external resistor is identified by the detecting circuit, the controller directs an output response in accordance to the resistance value detected. Typical output responses including generating of different voice messages, starting or stopping a motor or to turn on and off an LED.

In order to eliminate the requirement of an operational amplifier, the logic transition threshold of an IC can be used to detect the reference voltage created by an external resistor. Technically the sensitivity of an IC logic level transition switching threshold circuit is incomparable with that of an operational amplifier or a voltage comparator. In order to improve the detection sensitivity, an external transistor is included to amplifier the sensing current feeding to the input detection circuit. Alternately, the transistor can be reconfigured to form a switching circuit, which creates an external threshold switching sensor, that eliminates the variation caused by the fabrication process of the IC. To further improve the sensitivity, two external transistors are configured in the form of a Darlington pair to further increasing the current gain of a single transistor. Because of the high fluctuation of beta gain in the external transistors, the concept of an external reference component or a calibration process is more important for the circuit to be able to resolve the 5% resistance tolerance. It should be noted that the external bipolar transistors are not suitable to be integrated into the IC when it is fabricated with CMOS technology.

When the resistance identification circuit is used to trigger different voice messages, the IC is required to provide a memory location to store compressed digital information representing the predefined messages. This memory location can be represented by ROM (Read Only Memory) or RAM (Random Access Memory) or other different kinds of logic storage memory including Flash memory. The duration of the voice message stored depends on the size of the storage memory and the compression ratio of the voice encoding/decoding algorithm, which also affects the voice quality. Existing commercially available voice generation chips are provided with different memory sizes to optimize the cost of voice chip for use in different applications that require different total voice durations. For example, each IC body of a typical voice generation IC product line may comprise a standard decoding circuit, a Digital to Analog conversion circuit and a speaker driver circuit, but a choice of different ROM sizes to provide 3 seconds, 6 seconds and up to multiple minutes for voice storage. Each of these IC members of the product line, although using substantially the same decoding circuit, requires a separated set of mask to build the IC. Each member IC of the product line requires engineering time and overhead to reroute the IC during it's development stage. Accordingly the cost to develop the IC product line is proportional to the number of IC members designated in the product line according to the marketing requirement. Assuming a voice IC product line has ten different members, each providing a different total voice duration; by introducing an integrated resistor identity detection circuit, the product line is required to be expanded to 20 different IC members, ten with resistor identification capability and ten without. On the other hand, different IC applications require different number of IO (input and output) pads. Applications involving high number of keypads and an array of light indicators such as a child size follow me learning piano requires substantially more IO pads than a push a button, get a sound kind of simple toy. The number of IO pads forms a significant portion of the cost of an IC especially when the dice size of the IC is small. Accordingly in addition to the variation of memory size, different IC members may be included in the product line to tailor for different IO pads requirements. Assuming there are ten different ROM sizes variations and five different IO pads variations, the total possible chip combinations are 5×10=50. When the optional resistor directive feature is added, the number of possible combinations is extended to 100 that is well beyond the reasonable number of IC members to be included in an IC product line.

In addition to the optional resistor identification circuit, there are other kinds of optional functional blocks to be added for enriching the capabilities of an IC family, such as LCD driver; infrared signal transmission/receiving interface; keyboard scanning circuit; high output current output port suitable for driving speaker directly with PWM modulation and also RF communication circuit such as blue tooth interfacing circuit. Each of these circuits may not be optimally fabricated by the same kind of technology. For example, most logic circuit is desirable to use CMOS technology; power circuit is more suitable to be fabricated by traditional power MOS technology or bipolar technology. RF circuit may require a further different technology. In order to provide an optimal combination of the final functional IC, it is also the objective of the subject invention to provide an infrastructure standard enabling the different functional blocks, each may have a variation of specifications, to be selected by the application engineer in accordance with the product requirements of a project.

Technically it is also possible to provide a combination of selected functional blocks to compose a single IC chip through an ASIC (Application Specific IC) design process if these circuits belong to the same type of IC fabrication technology. Functional blocks of circuits are selected and combined to form a final single chip IC. However, the ASIC chip concept has several drawbacks:

1. The product development time is substantially longer than the development process using an off the shelve micro-controller.

2. Engineering prototype is more expensive and takes longer time to obtain.

3. Production lead-time of the ASIC chip is also substantially longer than commercial programmable chips, because wafer bank cannot be prepared prior to receiving production order. Short development cycle time and production lead-time are particularly important because in the existing business world, product life is becoming shorter and shorter due to rapid changes of market conditions.

4. The MOQ (minimum order quantity) of ASIC chips is high and not economical for small quantity production. On the other hand, standard micro-controller ICs are commodity items available in smaller quantities.

5. Whenever there is a design feature change, possibly affecting the circuit of only one functional block inside the ASIC chip, the whole design and production cycle need to be restarted.

6. Whenever a design bug is found in any one of the functional blocks, the whole ASIC chip is to be scrapped. More important, the recover time to deliver another ASIC chip is also intolerably long especially when the bug is discovered at the time the product is about to be shipped.

7. For timing critical applications, real time applications or projects that require a lot of controller resources, it is often found that the resources of the controller inside the ASIC chip is not adequate to handle all the jobs. The controller resource is particularly tight when more functions or functional blocks are added into the ASIC design.

Accordingly it is the objective of the subject invention to provide a VSFB (Variable Specification Functional Blocks) IC system in according to the following desirable specifications:

1. Providing at least one universal central controller ICs, each having one or more communication channels;

2. Providing different families of VSFB ICs, also termed as accessory VSFB ICs; each family serves a different function, part of the work load of the central controller is delegated to the controller located inside the VSFB chip;

3. All VSFB ICs of a family are designed to interface with the same kind of standard communication channel offered by the controller IC;

4. Preferably the universal controller IC and each VSFB IC are offered in dice form;

5. Providing a printed circuit board to integrate the controller dice and the VSFB dices together to form a COB (chip on board) assembly, in case the universal controller IC and the VSFB IC are offered in dice form;

6. Since the power requirement of each VSFB IC may be different, each VSFB IC may be provided its own power pads than to share power from the controller chip through the interfacing circuit.

Other further desirable features of the VSFB system includes:

1. Specifying the communication channel to be a standard high speed serial communication port;

2. The power lines of each VSFB IC is connected to the source points of the power supply to firstly minimize power line common mode noise; and secondly, prevent over designing the power supply of the central controller;

3. Providing a compiler to specify the specific VSFB IC selected and the connection of the system. Although each VSFB may or may not has it's own micro-controller, the compiler software is configured to program all different controllers of the COB at the same time by a single program; pretending that the communication interface is transparent to the programmer. After compiling the program, different executable codes are generated for the different processors of each VSFB IC;

4. The communication speed for different VSFB ICs may be different to facilitate timing management of the central controller; alternately the less busy VSFB IC may communicate with the central controller with occasional burst of data through the serial communication link;

5. One draw back of the VSFB concept is that electromagnetic coupling interference and radiation are usually higher than an ASIC chip due to the situation that all VSFB ICs and the central micro-controller are more spread out on the COB than an ASIC single chip design. Since the VSFB ICs are closely located to the central controller on the COB and there is no power requirement in the communication interface, the noise immunity requirement between the communication interface is of much less weight as compared with traditional printed circuit board assembly design. Accordingly it is recommended to make use of a RSCI (reduce signal communication interface) technique to reduce the level of electromagnetic interference (EMI) and enabling the final product to easier passing the requirements of FCC.

6. For the benefits of the consumer, it is highly desirable to implement the VSFB technology with a business model that defines an industrial recognized standard for the communication interface, so that different VSFB ICs supplied by different vendors can be used on the same COB design. This standard is particularly important for the RSCI interface specification because of the reduced noise margin of the chip design. An industrial standard is defined by having at least two different companies to provide VSFB ICs to work on the same interfacing design specification. It should be noted that the standard is preferred to cover the software programming specification as well;

7. To further reducing the cost of the system, daisy chain connection of the serial interface among RSCI chips is enabled. In this case, one high speed serial port on the central controller may be adequate for most applications. The most busy VSFB IC should be connected closest to the central controller to minimize signal delay and also to further reduce electromagnetic coupling interference.

The RSCI technology is a proprietary interfacing technique developed for the invented VSFB COB assembly. The principle is to reduce the noise immunity capability of the interfacing circuit by reducing the interfacing signal current or the interfacing signal voltage amplitude of the communication channel connecting between two ICs. This is against the traditional wisdom of designing a communication channel connecting two different components or two different equipments that driving capability of communication ports should be as high as affordable. A lower interfacing current or signal voltage will result in less RF power transmitted. For example, the traditional digital signal amplitude between a serial interface connecting between two ICs operating at 5V is usually around 3.5 to 4.5 volt depends on the loading condition of the communication channel. The RSCI circuit intentionally introducing a voltage drop circuit to reduce the communication circuit voltage to 0.5 or 1 volt, on the other side, the logic transition threshold level is shifted to around the mid level of the reduced amplitude digital pulsing signal. The degree of signal voltage to be reduced is limited by the voltage variation of the application circuit, and also the maximum distance between the two dices on the COB. Although VSFB ICs may locate closer than 0.5 inch from each other, it is desirable to specify the voltage level to work with a separation of 4 inches maximum on COB design. It should be noted that the example illustrates the concept of RSCI in voltage form, the same RSCI principle is applicable on current form as well; that is to provide full voltage swing but much lower current driving capability between the transmission end and the receiving end. This current is unable to provide sufficient noise immunity under normal communication condition such as the communication interface in between computer and the peripherals but be adequate for interfacing COB VSFB designs.

Attention is now directed to the technique of IP (integrated programming) derived through the development of the subject invention. Integrated Programming is the method to provide a compiler suitable for programming the central controller and the different VSFB ICs all in one program. The compiler treats all ICs on the COB as one single entity, or a larger more complex single IC. The compiler is arranged to automatically provide the following hidden function without the attention of the programmer:

1. Establish communication protocol for the central controller and the VSFB chips according to the connection specified and the type of chip selected;

2. Handle control timing between the communication signals;

Another model to visualize and understand Integrated Programming is for the compiler to treat the whole COB assembly as one single ASIC chip, although actually there are different controllers embedded in the different VSFB chips located on the same COB assembly. In the VSFB model, the ASIC chip is dissected into different VSFB chips mounted on a COB and linked together by standard communication links preferably in serial format. In addition to carrying out the above hidden functions specified, the compiler distributes the VSFB specific instructions to the driving program of individual VSFB controller chips and centrally coordinate the interactive activities of these VSFB chips by the program located at the central controller. The technique is applicable to many programming languages such as Assembly language and the higher level Easy Format™, a table format programming language disclosed by the applicant in U.S. Pat. No. 5,867,818 and pending U.S. patent application Ser. No. 09/419,752.

Attention is now directed to the optimal arrangement in planning for a product line of features enriched microcontroller chips making use of the VSFB concept. Although various functions are recommended to be provided by regional VSFB ICs for greater design flexibility, it is highly desirable to put in some additional basic functions into the central controller chip according to the target field of service. For example, when an IC product line is developed to serve the toy industry, it is preferable to have the voice generation block to be included in the central controller. This is because most electronics toy products produce sounds. However, the memory size of the central controller chip having a voice producing capability can be restricted to three seconds, a reasonable minimal value to get started. Additional voice duration or multiple channel functions, can be added by a line of VSFB chips.

The novel features of the invention are set forth with particularly in the appended claims. The invention will be best understood from the following description when read in conjunction with the accompanying drawings.

DESCRIPTION OF THE PREFERRED EMBODIMENT

Figure 1:
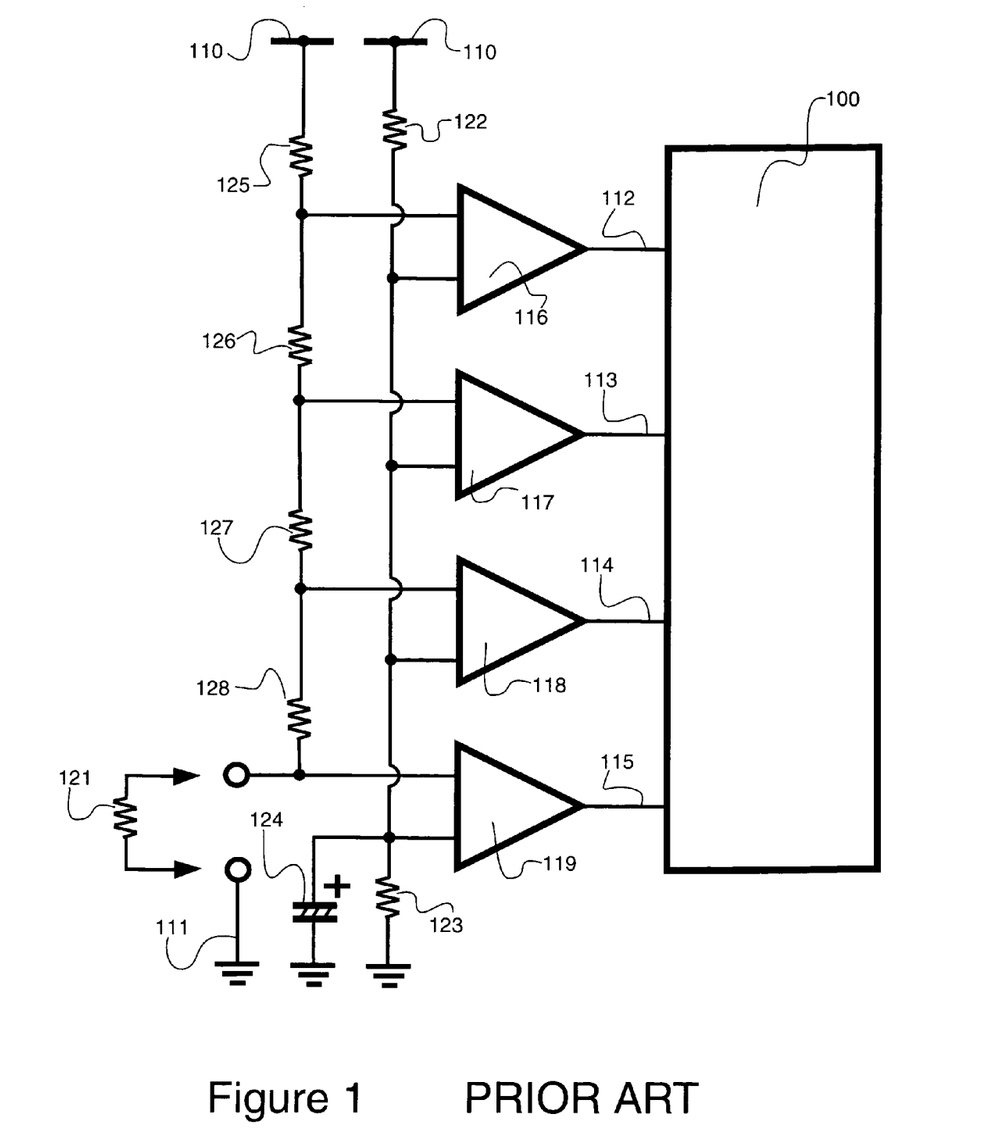
FIG. 1 is a prior art circuit demonstrating the concept of using an external resistor for identification purpose.

FIG. 1 shows a prior art circuit that made use of an external resistor for identifying a responsive voice message to be played. This concept was invented by the applicant when he designed a toy named ARCO—Once Upon A Time Playset for Mattel Inc. during April 1994. Resistor 121 is one of a series of external resistors, each embedded into an identity article, such as the food article described in the summary of the invention. When connected to the junction point of reference resistor 128 and the input terminal of the comparator 119, the resistors 121, 128, 127, 126 and 125 form a ladder network, which provides different sensing voltages to the input of the comparators 116 to 119. The reference comparison voltage of the comparators 116 to 119 are defined by the potential divider resistors 122 and 123. This sensing voltage is stabilized by the capacitor 124. Assuming that the reference comparison voltage is set at 0.5

VB, that is half of the power supply voltage 110, any input voltage lower than 0.5 VB will provide a logic level change, that provide switched signal at the output of the comparator. Assuming the value of resistors 125 is 100 k ohm, resistor 126 is 30 k ohm; resistor 127 is 10 k ohm, and that of resistor 128 is 4.7 k ohm; then a resistor value of 140 k ohm for R121 will trigger comparator 119 but not the other three comparators. A resistor value of 130 k ohm for R121 will trigger both comparators 119 and 118. A resistor value of 100 k ohm for R121 will trigger comparators 117 to 119 but not 116. If the value of resistor 121 is smaller than 51 k ohm, then all comparators will be triggered. The micro-controller 100 directs different sound responses according to the responses of the comparators 116 to 119. It should be noted that the reference comparison voltages provided to the reference inputs of comparators 116 to 119 can be changed, that will provide a little more tolerance margin between the values of the identity resistors 121. Since the triggering signals 112 to 115 trigger the controller chip 100 by passing over the triggering threshold of the input pins, the comparators 116 to 119 may be removed if the triggering levels of the controller 100 are consistent and vary in proportion during the full operating voltage range. This prior art circuit design exhausted the range of identity resistance from 51 k ohm to 140 k ohm for providing only four working identity resistance values. It is the goal of this invention to provide a more superior circuit to resolve more than 30, and up to 97 identity resistances within this range, each has a tolerance of +/−5% from the neighboring nominal resistance value.

Figure 2:
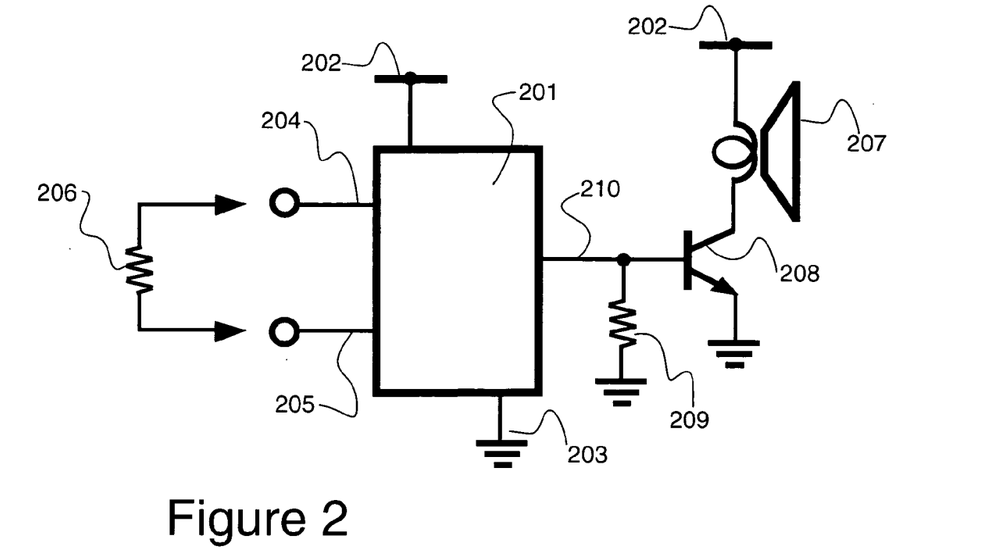
FIG. 2 is a circuit diagram showing a resistor identifying circuit configured to trigger different voice messages according to different resistance detected.

Attention is now drawn to FIG. 2 which illustrates the full circuit of a special chip design that provides both a built in resistor identity detection circuit and an audio circuit to drive a speaker 207 through a transistor 208. The resistor 209 set the biasing current supplied to the base of the transistor 208. The chip 201 is a single custom ASIC chip that provides the following functions:

1. At most two special trigger pins 204 and 205 are required to sense the resistor 206 instead of four as shown in the prior art. It should be note that line 205 can be connected to ground and the number of input pin is further reduced to one.

2. The controller chip 201 should be able to resolve the 5% tolerance of the resistor 206.

3. The detection circuit should work between the voltage range in between a specified voltage range of +5%/−40%. For three batteries operation, the working voltage range is 4.725V down to 2.7 volt. For two batteries operation, the working voltage range is 3.3V down to 1.8V. A typical voltage specification for this specially designed chip is between 2.2V to 5V, which covers the full range for 3 batteries operation and a reasonable range for 2 batteries operation.

Figure 3:
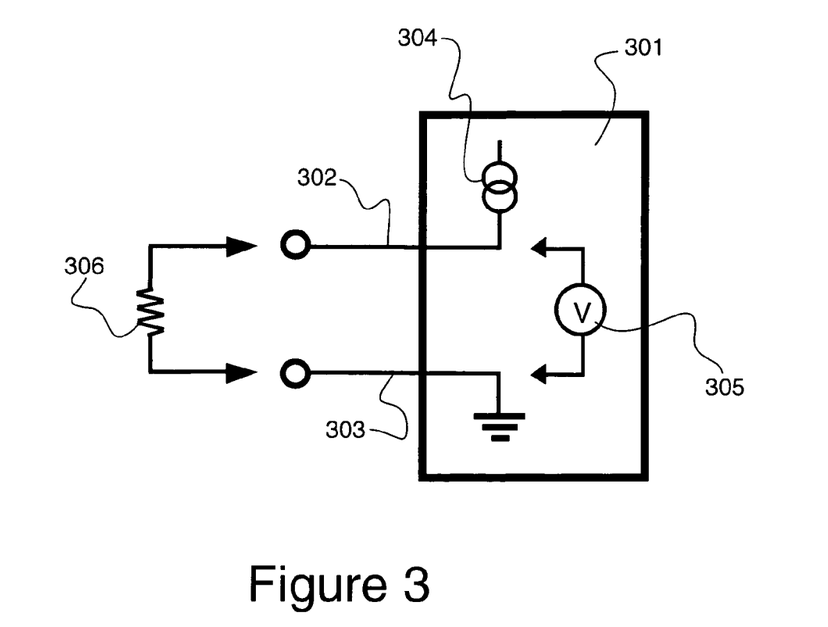
FIG. 3 illustrates the method to use a controlled current source for measuring the voltage drop across the external resistor.

FIG. 3 illustrates a method to detect the resistance of the external resistor 306. A micro-controller precisely controlling the current supplied to the identity resistor 306. This current produces a voltage drop, which can be checked by the voltage sensing circuit 305. In an alternate embodiment, the voltage drop developed across the identity resistor 305 can be fed to a threshold level detection circuit. In this situation, the current 304 is manipulated by the controller to determine the closest current required to match the voltage drop of the resistor with the predefined threshold level.

Figure 4:
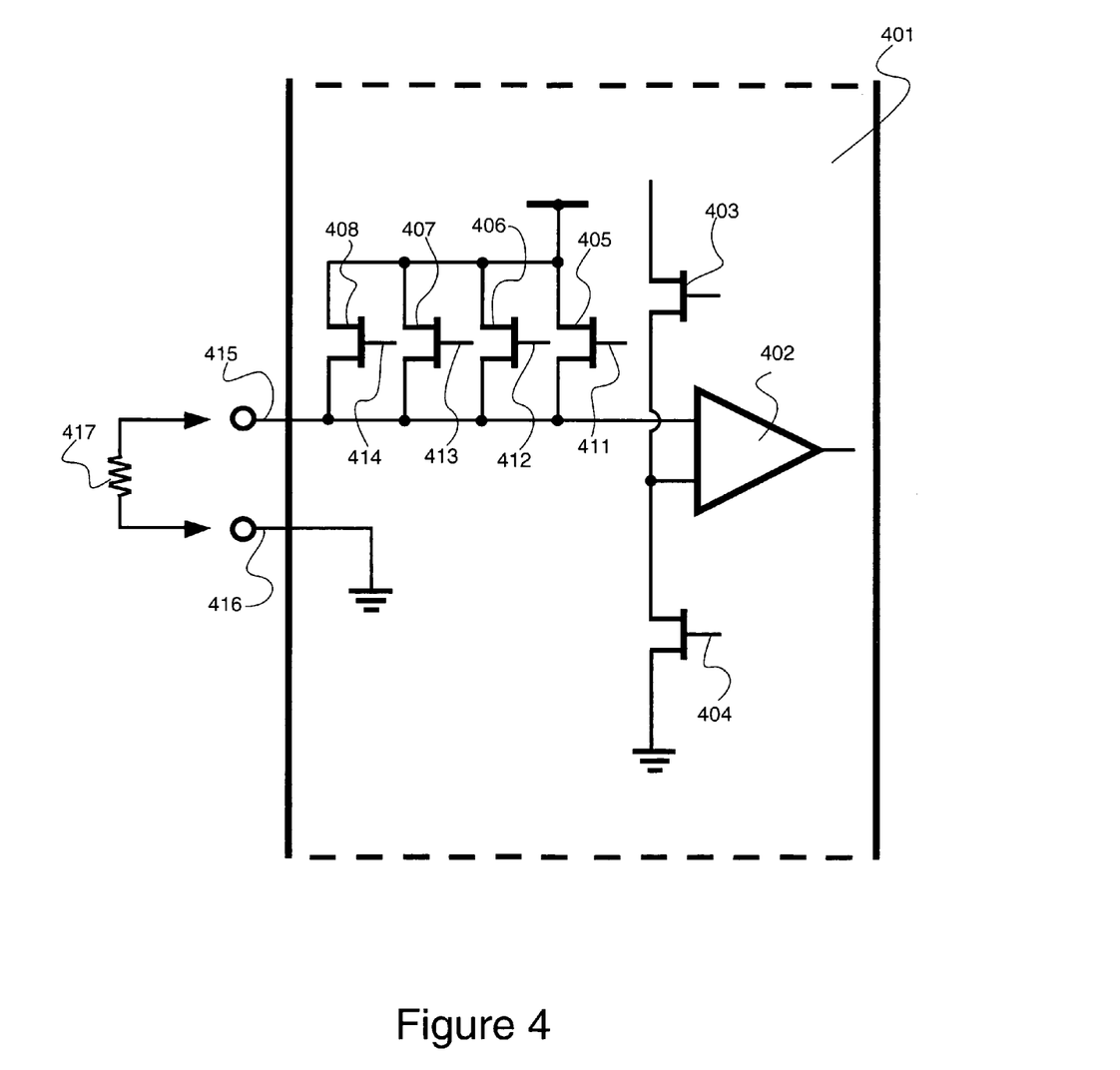
FIG. 4 is the schematic illustration of a MOS circuit providing a switched current source to work with a broad range of tight tolerance resistors for determining the unique identity represented by the resistor.

FIG. 4 illustrated a preferred embodiment which implemented the circuit description of FIG. 3. The controlled current source is represented by the switching gates 405 to 408. The control lines 411 to 414 are connected to the CPU circuit of the microcontroller 401. Each gate of 405 to 408 is carefully designed and etched to provide a precise current required to resolve the precise resistance value of 417. If a total of 97 different resistance values from 100 ohm to 1M ohm are to be detected, a total of 97 precise switched current choices are to be provided. These precise switched currents can also be provided by a group of switched gates arranged in parallel, as shown, or in series, or in the combination of series and parallel arrangement. The voltage developed across the identity resistor is sent to a threshold detector. Alternately, a fewer number of reference currents may be pumped to the identity resistor and the voltage developed is compared by an internal comparator circuit. In this case, the switching circuit represented by the gates 405 to 408 should be relocated to set the comparison reference voltage of the comparator 402, as represented by the reference gates 403 and 404. In order to further enhancing the tight tolerance resolution capability under the variation of battery supply voltage, an internal regular is recommended for the detection circuit.

Figure 5:
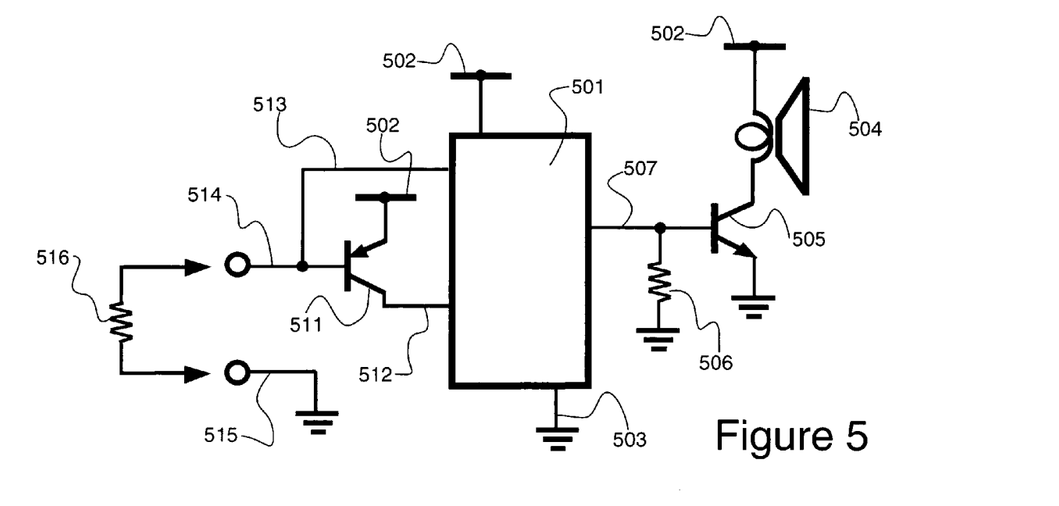
FIG. 5 is another embodiment of the detector interfacing circuit.

Technically it is extremely demanding to differentiate the current pump into a broad range of two close values resistors, such as 100 ohm and 110 ohm; all the way up to the pair of 910 k ohm and 1M ohm resistors; especially under a big variation of working voltages and possibly an electrically noisy working environment. One of the difficulties is the cut in current required by a threshold detection circuit especially for it to work with the high resistance range. If the technology of choice is CMOS, the research of this invention directs the desire to put in an external bipolar transistor to buffer the threshold sensor, or to amplify the sensing current. FIG. 5 is an enhancement of the circuit shown in FIG. 4. The interfacing transistor 511 is configured in a common emitter mode such that the threshold voltage of the input pin 512 is converted to the $V_{BE}$ voltage of around 0.7V from the battery voltage supply 502. The biasing voltage is provided by the signal line 513, which is connected to an internal current source provided by the controller chip 501. The switched voltage is directed to trigger the threshold input 512. In an alternate arrangement, the transistor 511 is replaced by a NPN transistor and the circuit forms a common collector mode of operation. The threshold trigger voltage is raised by around 0.7V from its original value. The cutoff current required to trigger the threshold sensing circuit is reduced to a level of $1/h_{fe}$ of the transistor.

Figure 6:
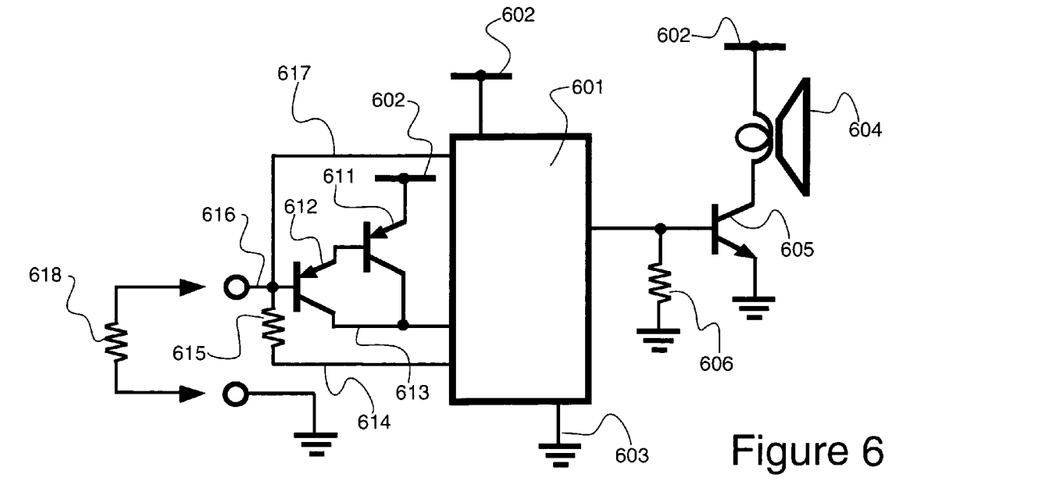
FIG. 6 is an enhancement of the circuit illustrated in FIG. 5 to improve interfacing sensitivity and further providing an external reference resistor for calibration purpose.

FIG. 6 illustrates a modification of the circuit to further improve the sensitivity of the external interfacing circuit. The transistors 611 and 612 are arranged to form a Darlington pair circuit such that the effective gain of the pair is obtained by multiplying the gain of the individual transistor. The threshold voltage is shifted to 0.7V×2=1.4V from the supply voltage. Since the effective gain of the circuit is quite high and there is a significant variation in the beta value of the transistors, reference resistor 615 is added for calibrating the biasing current supplied to the transistors. Alternately, resistor 615 can be used as a standard reference resistor for the circuit to set up internal calibrated data before resistor 618 is connected with the detection circuit. The line 614 can be turned on and off according to the calibration requirement of the chip. Similar to the situation of FIG. 5, the transistors 611 and 612 can be changed to NPN type and arranged as a current amplifier for triggering the internal threshold detection circuit through the pin 612.

Figure 7A:
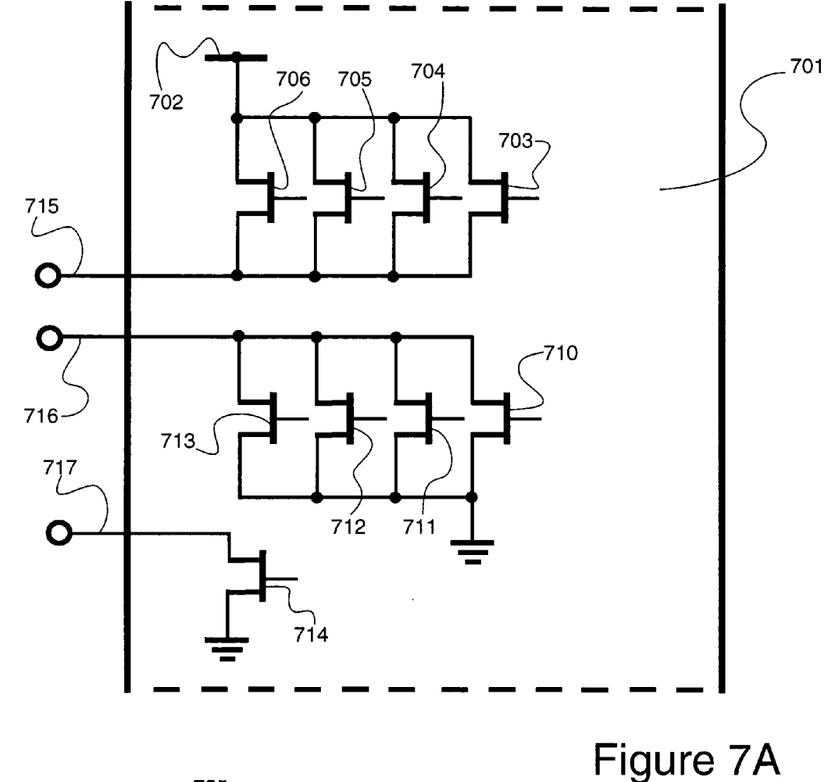
FIG. 7A illustrates an embodiment of the internal PMOS and NMOS arrangement configured to work with the circuit of FIG. 6.

FIG. 7A illustrates an embodiment of the internal circuit forming the controllers IC 501 and 601 of FIG. 5 and FIG. 6. Taking FIG. 6 as reference, the output 715 of the switching gates 703 to 706 is represented by the pin 617 of FIG.

Figure 7B:
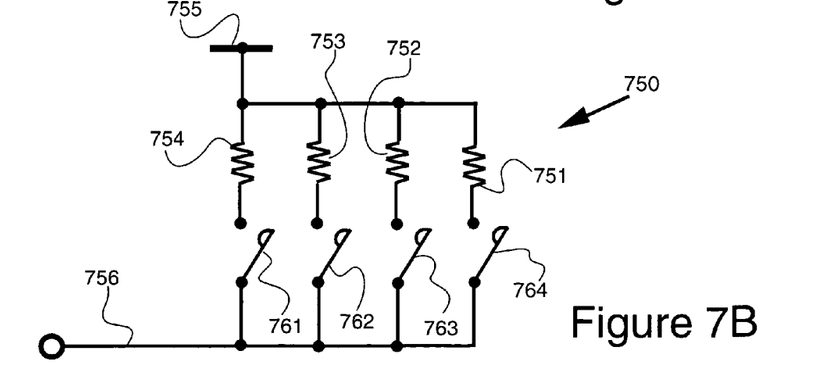
FIG. 7B illustrates the equivalence circuit of each switching element of FIG. 7A.

6. Attention is now directed to FIG. 7B which illustrates a row of resistors 751 to 754, each controlled by a switch 761 to 764. The resistor and switch array of FIG. 7B is the equivalent circuit of the switch gate array 703 to 706 and 710 to 713 of FIG. 7A. The high precision switches 703 to 706, each will give an exact biasing current to just turn on the transistors pair 611 and 612 when an appropriate resistor value of 618 is connected. In an embodiment, each target identity resistor value is to be matched with the precise resistance of one switching gate. It means an array of 97 switching gates are required to manage the detection of 97 identity resistors. By using the software to sequentially turning on the switching gates, the proper resistance of resistor 618 can be identified. In order to speed up the detection speed, the successive approximation technique, a skill well known to the people skill in the art can be applied. The first try can be started at a resistance value located around the middle of the range. The second try is to start at a higher quadrant value or the lower quadrant value according to the finding of the first try, and so on.

In the whole process there are many possibility of error that make the system fail to recognize the tight resolution required. For example, the temperature change may affect the temperature coefficient of the interfacing transistors. The beta gain of the transistors may be of too big a range. The switching resistance of the IC may vary according to the fabrication process. Battery voltage variation may impose errors especially under extreme sensing current and marginal working conditions. In order to compensate the variation of all the errors, a calibration process is included for the chip to self calibrate the system before it starts the identification recognizing process. Resistor 615 is specified to have a preset value. It is then connected to the switching gate array 710 to 713 through the lines 614 or 717. Since the resistance 615 is predefined, the switching gate can be set to provide the current predefined for the value of resistor 615. The gates 710 to 713 starts to fine tune the detection circuit until the proper triggering level is obtained; and therefore a compensated condition is achieved. The final correction condition can be reconnected to the input pin of the transistor 612 via the line 617. In another embodiment, the reference resistor 615 is connected to the switch 714 of FIG. 7A through the line 717. Compensation is obtained by shifting up or down the switching gates 703 to 706 of FIG. 7A.

In considering the standby current, the logic of the chip is designed in a way such that any valid trigger should wake up the chip from a low standby current stage for it to start working. Accordingly, a very high biasing resistance is provided to line 617 for FIG. 6 to ensure the transistors are turned off during standby mode; and that a resistor 618 of value as high as 1M ohm is able to cause a logic transition of the transistor pairs 611 and 612.

Figure 8:
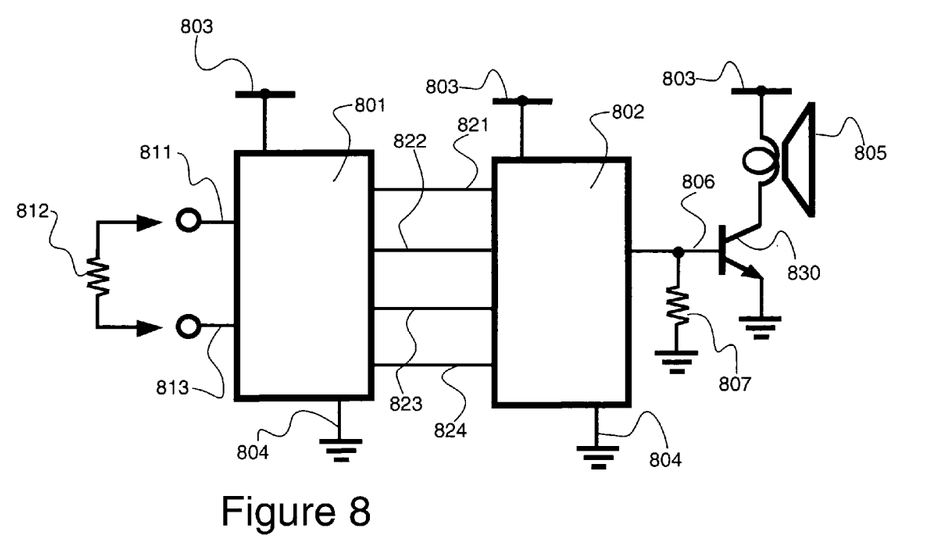
FIG. 8 illustrates the arrangement to use a resistor detection ASIC chip to interface with a standard voice generating chip.
Figure 9:
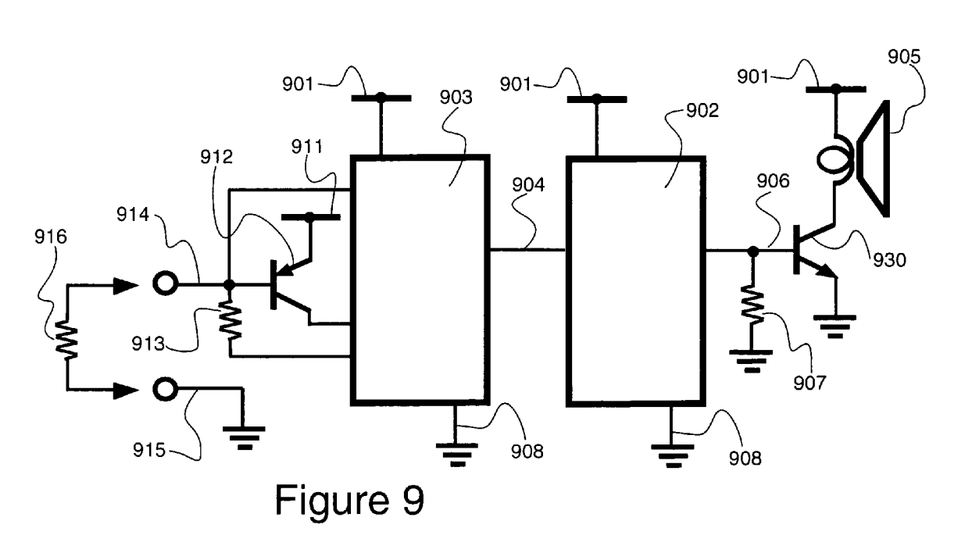
FIG. 9 introduces the arrangement of a VSFB circuit design to interface a VSFB resistor detection IC with a VSFB voice generating IC that can be configured as the central controller for interfacing with other VSFB chips.

Since all existing voice generating controller chips do not have any resistance detection capability, it is one of the objectives of this invention to provide a special single chip to provide a digital identity number that represents the unique resistors identified. In order to send out the ID of 97 different resistor values, a 7 bits signal data is required. FIG. 8 shows the interfacing circuit of such a resistor detection IC 801 to interface with a voice generating chip 802. The four interconnecting lines provide the identity of 16−1=15 resistor values. To make the connection simpler to work with a higher number of resistors, the two chips are connected by a serial link 904 as shown in FIG. 9. From here a VSFB (Variable Specification Functional Block) is developed that make use of a standardized serial link to interface with different functional specific ICs. All these ICs are combined on a COB (chip on board) assembly. The whole COB assembly in fact simulates a complete function specific ASIC chip of a more complex microcontroller. The standardized serial links can be cascaded or daisy chain connected to minimize the number of serial ports required by the central controller. Although each VSFB IC requires a program to perform it's intended function, an IP (Integrated Programming) method is developed such that a single program is required to program the central controller and all the different VSFB chips at the same time. Of course IP programming requires the programmer to specify what type of VSFB ICs are combined together. Since all connections and interface characteristics are predefined, IP programming will provide executable codes to control the central controller and all related VSFB ICs with one program, treating the central controller and all connected VSFB ICs as a single processor IC.

Figure 10:
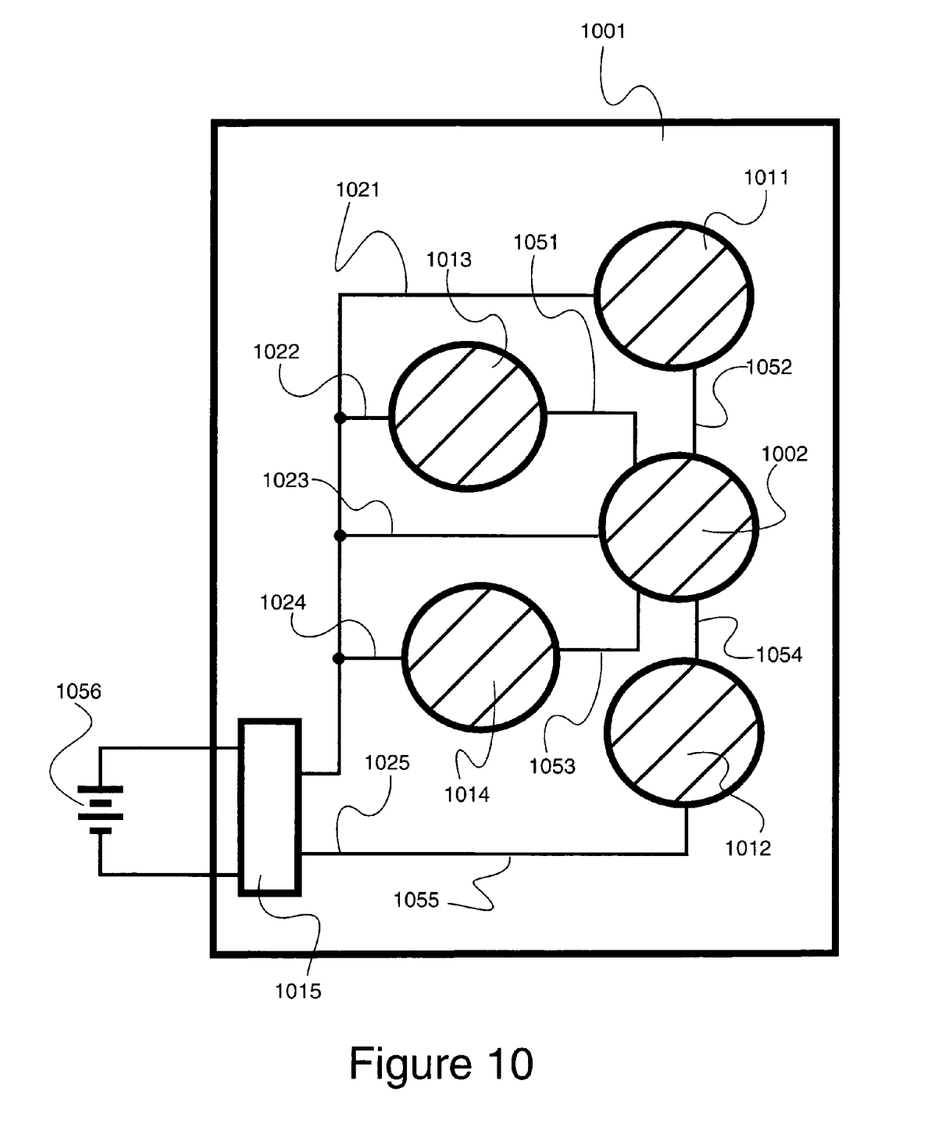
FIG. 10 is a COB assembly having four VSFB dices bonded on the same PCB, each linked to the central controller by a serial link.

FIG. 10 illustrates the physical top view of a COB that makes use of the VSFB technology. The central controller 1002, and the VSFB ICs 1011 to 1014 are "die bonded" onto the printed circuit board 1001. Each of the VSFB IC 1011 to 1014 is connected to the central controller 1002 via the standardized serial links 1051 to 1054. The VSFB ICs do not draw power from the central controller. Each of them has a power line 1021 to 1025 connected to the power socket 1015 that obtained the power supply from the batteries 1056.

Figure 11:
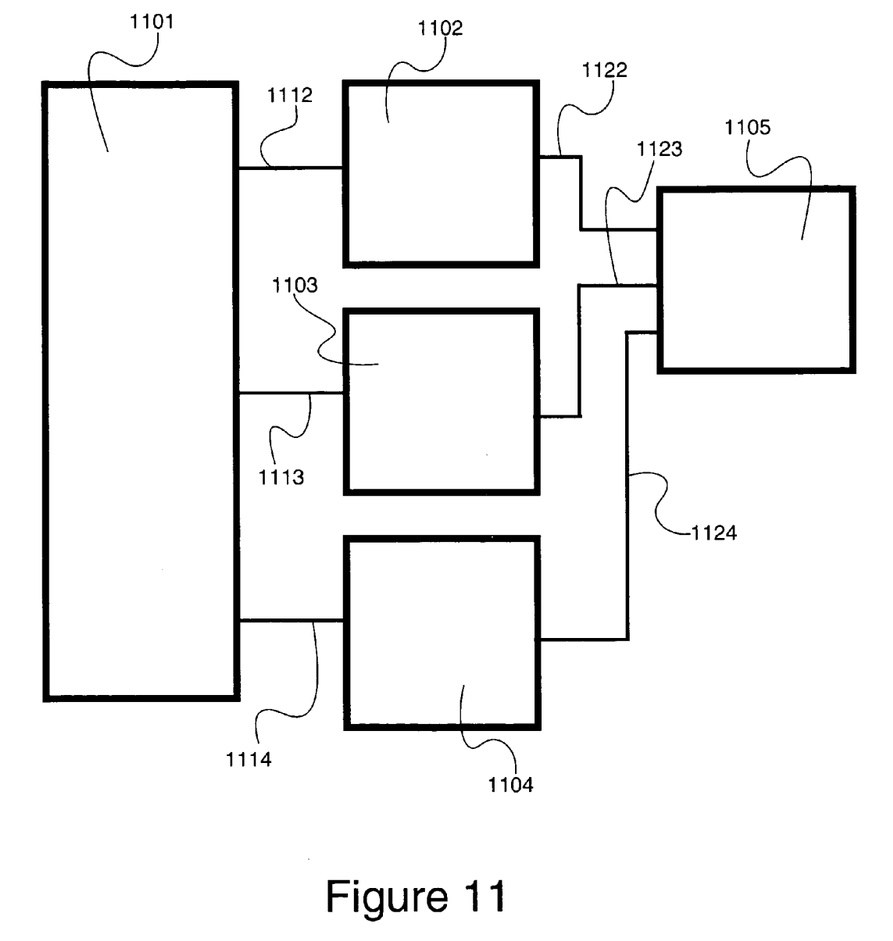
FIG. 11 is the circuit diagram representing a three VSFB chips assembled to form a COB.

Since the dies 1002, 1011 to 1014 are closely located together as shown in FIG. 10, the current handling capability and the noise immunity capability is compromised to reduce the cost of the ICs and also to minimize EMI interference. FIG. 11 illustrates the circuit diagram that has three VSFB ICs 1102 to 1104 connected to the central controller 1101, each via the standardized serial communication lines 1112 to 1114. The power lines of the VSFB ICs are connected separately to a power source 1105. The COB 1001 is treated by the Integrated Programming software as a single processor IC. The codes generated are then embedded into the memory of the VSFB chips. Finally, the COB is connected with a printed circuit board assembly as a single IC processor to provide the desired functions.

The further success of the VSFB technology requires a business model that bring different competing IC designers and suppliers to agree on a common serial interface specification; so that the different VSFB chips provided by different vendors can be shared on a COB design to benefit the users.

With the above examples, it is observed that a specially designed resistor identity IC is provided for products that require article identification on contact. The invention is further developed to provide a family of Variable Specification Functional Block ICs that can be selected to form a COB assembly. This assembly represents a complete ASIC chip, while enabling the users to select ICs representing different functional blocks without going through the long lead-time ASIC development process. An Integrated Programming technology is developed to program all the different controllers on the COB with one single program. A Reduced Signal Communication Interface technology is also introduced to minimize EMI interference of the COB assembly.

Although resistor detection is described in this application, the concept is applicable to precision single chip identity detection circuit making use of other passive components such as capacitors.

What is claimed is:

1. A variable specifications functional blocks integrated circuit (IC) system comprising:
a first master processor IC having at least one standardized serial communication port configured to communicate with different accessory functional block integrated circuits; and
at least a first and a second families of accessory functional block ICs wherein:
each of said families of accessory functional block ICs has a unique functional personality defined for different application purposes and said second family of accessory functional block ICs further comprises of two or more family IC members.

2. The variable specifications functional blocks IC system of claim 1 wherein said first master processor IC comprises of at least a first and a second standardized serial communication ports and each standardized serial communication port is configured for communicating with all different family members of said accessory functional block IC families.

3. The variable specifications functional blocks IC system of claim 2 wherein said first and second standardized serial communications ports are of identical technical standard defined by the design characteristics of said standardized serial communication ports.

4. The variable specifications functional blocks IC system of claim 1 wherein two or more member ICs of said accessory functional block IC families are installed together with said first master processor IC as a chip on board assembly.

5. The variable specifications functional blocks IC system of claim 4 wherein said first and second standardized serial communications ports are designed with low current circuits for said first master processor IC to communicate with the IC members of any accessory functional block IC families up to 8 inches apart.

6. The variable specifications functional blocks IC system of claim 4 wherein the said chip on board assembly comprising said first master processor and said accessory functional block ICs represents a single microprocessor of higher circuit complexity.

7. The variable specifications functional blocks IC system of claim 1 further comprising a software configured to integrally program the functional activities of said first master processor and said accessory functional block IC(s).

8. The variable specifications functional blocks IC system of claim 7 wherein said software requires a step to define the accessory functional block IC member(s) connected with said master processor IC.

9. The variable specifications functional blocks IC system of claim 7 wherein at least one accessory functional block IC member connected with said master processor IC comprises a processor, and said software enables a single program to provide a first code executable by said master processor IC and a second code executable by said accessory functional block IC member.

10. The variable specifications functional blocks IC system of claim 8 wherein said software treats said master processor IC and at least one accessory functional block IC as a single entity.

11. The variable specifications functional blocks IC system of claim 1 wherein said first family of accessory functional block IC comprises an Identification IC enabling said master processor IC to provide a programmed response according to the value of a resistor connected to said identification IC.

12. The variable specifications functional blocks IC system of claim 11 wherein said identification IC comprises of at least one array of switched resistors configured for identifying the values of an external resistor connected to said identification IC.

13. The variable specifications functional blocks IC system of claim 11 wherein said Identification IC is configured to resolve resistors with nominal tolerance of 5%.

14. The variable specifications functional blocks IC system of claim 11 wherein said Identification IC is provided at least one external reference resistor for calibration.

15. The variable specifications functional blocks IC system of claim 11 wherein said system is configured to be transformed from a low current standby mode to a higher current operation mode when a resistor is connected to said identification IC.

16. The method of providing an electronics circuit assembly responsive to a program comprising the steps of:
(1) providing a first master processor IC having at least one standardized serial communication port configured to communicate with different accessory functional block integrated circuit;
(2) providing at least a first and a second families of accessory functional block ICs for supplementing said first master processor IC, wherein:
each of said families of accessory functional block ICs has a unique functional personality and said second family of accessory functional block ICs further comprises of two or more family members.

17. The method of providing an electronics circuit assembly responsive of claim 16 further comprising a step of selecting an accessory functional block IC and interconnecting said first master processor IC with said selected accessory functional block IC by a single printed circuit board assembly.

18. The method of providing an electronics circuit assembly of claim 16 comprising a further step to provide a software configured for a designer to program said master processor IC and one or more accessory functional block ICs simultaneously with a single program.

19. The method of providing an electronics circuit assembly responsive to a program of claim 17 wherein said selected accessory functional block IC is configured to identify the resistance of an external resistor for said master processor to provide a response.

20. A microcontroller represented by a chip on board (COB) assembly comprising a first master processor integrated circuit (IC) having at least two standardized serial communication ports each configured to communicate with a different accessory functional block IC; and
at least a first and a second accessory functional block ICs fabricated for servicing different application purposes; wherein
said first and second accessory functional block ICs are selected from at least two families of accessory functional block ICs and said second accessory functional block IC family comprises of two or more IC members.

21. The microcontroller of claim 20 wherein each of said standardized serial communication ports comprises of low current interface circuit enabling said master processor IC to communicate with said first and second accessory functional block ICs at a distance up to 8 inches apart.

22. The microcontroller of claim 20 wherein at least one of said accessory functional block ICs comprises a processor; wherein said microcontroller further provided a software treating said microcontroller as a single integrated circuit and enabling a designer to program said master processor IC and said processor supported accessory functional block IC with a single program at the same time.

23. The microcontroller of claim 20 wherein one of said accessory functional block IC is configured to identify the resistance value of a first external resistor for said master processor IC to provide a programmed response according to the value of said first external resistor identified.

24. A method to program a multiple processors functional blocks system having at least a first processor and a second processor connected together, wherein said first processor is configured to provide a first function and said second processor is configured to provide a second different function, said method comprising the steps of:

(1) providing a software treating said first and second processors to be a single processor configured to provide both first and second functions; and (2) generating with the software of step (1) a first code executable by said first processor and a second code executable by said second processor.

25. The method of claim 24 wherein said second processor is configured to identify the resistance value of an external resistor and said first processor is configured to provide a response according to the resistance value identified by said second processor.

* * * * *